United States Patent Office 2,821,009
Patented Jan. 28, 1958

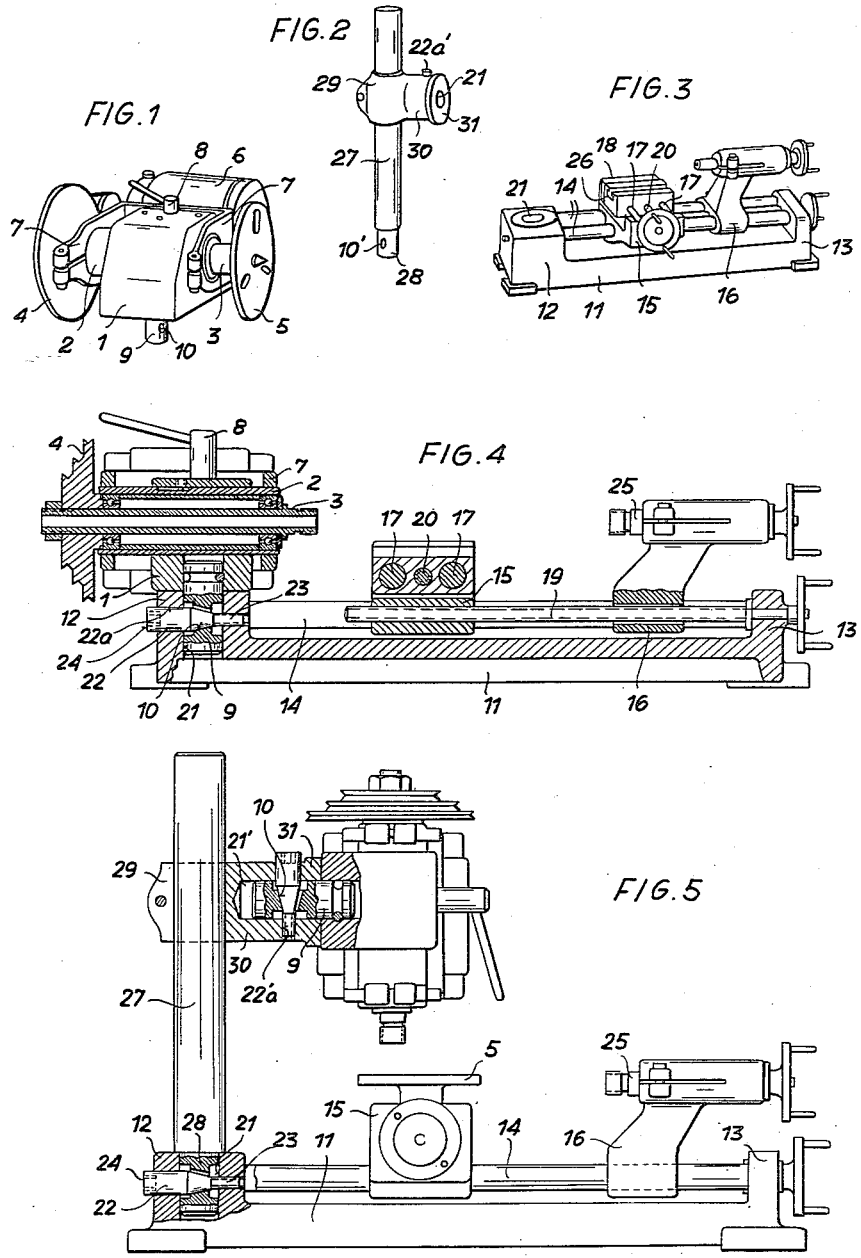

2,821,009

BENCH-TYPE MACHINE TOOL CONSISTING OF INTERCHANGEABLE COMPONENTS, PARTICULARLY FOR AMATEURS

Karl Maier, Hallein, Austria

Application August 1, 1955, Serial No. 525,675

2 Claims. (Cl. 29—27)

Radio and other amateur technicians, schools etc. are in great need of inexpensive machines such as lathes, drilling and grinding machines of small and very small type, which should be capable of adequately precise work in spite of low prime cost.

Bench-type machine tools have been suggested already which consist of interchangeable components that can be assembled on a base plate in several ways to form certain types of machines, such as a lathe, drilling, boring, grinding, milling machine and the like. One of said known sets comprises a column which is insertable into the machine bed and serves as a support for the headstock and drive motor.

Those known constructions, however, are relatively heavy and complicated and for that reason do not always permit of a ready conversion from one type of machine to another.

It is an object of the invention to provide a bench-type machine tool which can be readily converted from a tool having a vertical headstock spindle to a tool having a horizontal headstock spindle in spite of the fact that the entire machine tool consists of a minimum number of parts.

This object is achieved according to the invention by a bench-type machine tool which comprises, in combination, a base formed with a vertical bore, a column removably inserted in said bore, a bracket adjustably fixed to said column and formed with a horizontal bore equal in shape and size to said vertical bore in said base, and a headstock provided with a plug fitting said horizontal bore in said bracket and adapted to fit said vertical bore in said base after removal of said column from said vertical bore.

The headstock may be combined in a unit with the drive motor.

In a preferred embodiment of the invention the column has a lower end plug removably inserted in the vertical bore in the base and the plugs of the bracket and column are formed each with a tapered transverse bore; said base and bracket are formed each with a threaded bore extending transversely to and opening into said vertical and horizontal bores, respectively, and being aligned with the respective tapered bore. In this embodiment two pins extend in said aligned threaded and tapered bores; each of said pins have a threaded portion in mesh with said threaded bore and a portion tapered like said tapered bore and in engagement therewith.

When the headstock is horizontally arranged directly on the machine bed a lathe is obtained, or a horizontal boring, milling and grinding machine. Arranging the headstock on the column provides a machine which may be used for facing operations, e. g., on large-diameter belt pulleys, or as a vertical boring, grinding and milling machine adjustable in any direction.

Whether arranged horizontally or vertically, the headstock can be swung through 360 deg. and the headstock spindle can have attached thereto workpieces or tools, such as drills, milling cutters, circular saws, grinding wheels, buffing wheels, filing wheels and other rotary tools.

An illustrative embodiment of the invention is shown in the accompanying drawings, in which Fig. 1 shows a headstock with a motor attached thereto, Fig. 2 the column mounting the bracket, and Fig. 3 the machine bed. Fig. 4 is an enlarged sectional view of the machine bed mounting the headstock, and Fig. 5 illustrates the connection of the machine bed and headstock by means of the column and bracket to form a drilling, boring or milling machine.

The headstock 1 has inserted therein a spindle sleeve 2, which carries the spindle 3 with a cone pulley 4 and, as the case may be, a lathe chuck, a faceplate 5 or a drill chuck. The drive motor 6 is connected to the headstock by two straps 7. After the spindle sleeve 2 has been released by the clamping device 8 it can be moved axially within the headstock casing. At the underside of the headstock 1 a plug 9 is rotatably mounted. Close to its lower end the plug 9 is formed with a transverse taper bore 10.

The machine bed 11 has at its two ends pedestals 12 and 13. Between these pedestals two guide bars 14 extend, which serve to support the slide or carriage 15 and the tailstock 16. The longitudinal slide 15 has two transverse guide bars 17 carrying the cross slide 18. The longitudinal and transverse movements of these parts are effected by a longitudinal screw 19 and a transverse screw 20.

The pedestal 12 is wider than the opposite pedestal 13 and has a bore 21 fitting the plug 9 of the headstock 1. The headstock is located in the desired angular position by a taper pin 22 having a threaded end portion 23. The mating thread is provided in a transverse bore 22a formed in the pedestal 12 of bed 11 and receiving the taper pin. Opposite to its threaded end the taper pin is formed with a hexagon socket 24 for tightening the pin 9 and thus locating the headstock 1 in the intended angular position. When thus assembled the parts form a lathe, which can also be used as a horizontal grinder. The lathe spindle 3 and the spindle sleeve 25 of the tailstock are provided with similar threads, which enable the attachment of a gripping tool or drill chuck.

The cross slide 18 has a T-shaped groove 26, which extends in the longitudinal direction of the bed and is suitable for the mounting of a tool post, a boring or milling table or a workpiece. As is apparent from Fig. 5 the faceplate 5 may be used also as a table fixed on the cross slide.

Fig. 2 shows a column 27 which has a reduced lower end 28 of the same shape as the plug 9 of the headstock 1. Owing to that shape the column end 28 fits the bore 21 in the bed pedestal 12 and the column 27 may be used as a support in other types of machines, such as drilling, boring or milling machines. Just as the headstock the column is fixed in position by a taper pin 22, which extends through a transverse bore 10' in the column end 28. A bracket 29 is slidable and rotatable and can be clamped in position on the column. The bracket 29 has an extension 30 terminating in a flange 31. The extension 30 is formed with a longitudinal bore 21' and a transverse bore 22a', which are shaped like the respective bores in the pedestal 12 of the machine bed 11 so that the headstock can be held in the bore 21' of extension 30 by means of a taper pin 22. It is obvious that in this arrangement the headstock can also be set in any angular position.

The bracket 29 is formed to be gripped conveniently with the hand when it has been removed from the column so that the headstock connected to the bracket may be used as a hand drilling machine or hand buffing machine or the like.

What I claim is:

1. In a bench-type machine tool having a drive motor and a headstock, the combination of a base having a vertical bore therein, a column having a lower end plug removably inserted in said bore, a bracket adjustably fixed to said column and having a horizontal bore therein of the same shape and size as said vertical bore in said base and a plug for said motor and headstock identical to said lower end plug and fitting said horizontal bore in said bracket and said vertical bore in said base when said column has been removed from said vertical bore.

2. A bench-type machine tool as set forth in claim 1, in which each of said plugs has a tapered transverse bore and said base and bracket each have a threaded bore extending transversely to and opening into said vertical and horizontal bores, respectively, and being aligned with the respective tapered bore, and two pins extending in said aligned threaded and tapered bores, each of said pins having a threaded portion in mesh with said threaded bore and a portion tapered like said tapered bore and in engagement therewith.

References Cited in the file of this patent

UNITED STATES PATENTS

| 2,181,128 | Hack | Nov. 28, 1939 |
| 2,463,124 | Sims | Mar. 1, 1949 |

FOREIGN PATENTS

| 890,133 | France | Jan. 28, 1944 |